US012619816B2

(12) United States Patent
McDaid et al.

(10) Patent No.: US 12,619,816 B2
(45) Date of Patent: May 5, 2026

(54) INTEGRATING EXTERNAL PROGRAM CODE WITH SPREADSHEET APPLICATION

(71) Applicant: Microsoft Technology Licensing, LLC, Redmond, WA (US)

(72) Inventors: Joseph John McDaid, Seattle, WA (US); Keyur Patel, Seattle, WA (US); Arturo Goicochea Hoefken, Seattle, WA (US); Eoin Burke, Seattle, WA (US); Su-Piao Wu, Sammamish, WA (US); James Masson, Seattle, WA (US); Christopher Gross, Redmond, WA (US); Jake Elliot Armstrong, Toronto (CA); Carlos Augusto Otero, Seattle, WA (US); John Herbert Martin Williams, Cambridge (GB); Nicholas Charles Wilson, Cambridge (GB); Andrew Donald Gordon, Cambridge (GB); Neil Toronto, Cambridge (GB); Anders Hejlsberg, Seattle, WA (US); Guido Van Rossum, Seattle, WA (US); Shaofeng Zhu, Seattle, WA (US); Stephen Dower, Cambridge (GB); John Lam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 18/453,262

(22) Filed: Aug. 21, 2023

(65) Prior Publication Data
US 2025/0068835 A1 Feb. 27, 2025

(51) Int. Cl.
*G06F 3/048* (2013.01)
*G06F 40/18* (2020.01)

(52) U.S. Cl.
CPC .................................... *G06F 40/18* (2020.01)

(58) Field of Classification Search
CPC ....................................................... G06F 40/18
See application file for complete search history.

(56) References Cited

U.S. PATENT DOCUMENTS 9,015,671 B2 * 4/2015 Johnson .............. G06F 11/3688
717/113
9,582,288 B1 * 2/2017 Stewart ..................... G06F 8/34
(Continued)

OTHER PUBLICATIONS

"Electron", Retrieved from: https://www.electronjs.org/?, Retrieved Date: Apr. 21, 2023, 11 Pages.
(Continued)

*Primary Examiner* — Linh K Pham
(74) *Attorney, Agent, or Firm* — Novo TechIP International PLLC

(57) ABSTRACT

A data processing system implements receiving a first input in a spreadsheet in a spreadsheet application, detecting an indication that the first input includes first executable program code, analyzing the first executable program code to identify first references to one or more first elements of the spreadsheet in the first executable program code, requesting spreadsheet data associated with the one or more first elements of the spreadsheet from the spreadsheet application, receiving the spreadsheet data from the spreadsheet application; executing the first executable program code using the spreadsheet data referenced in the first executable program code to obtain a first program code result and causing the spreadsheet application to display the first program code result in the spreadsheet application.

10 Claims, 18 Drawing Sheets

(56)                    References Cited

U.S. PATENT DOCUMENTS

|  |  |  |  |  |
|---|---|---|---|---|
| 9,959,098 | B1* | 5/2018 | Smith Devine | G06F 40/18 |
| 11,086,894 | B1* | 8/2021 | Srivastava | G06F 16/2282 |
| 11,170,165 | B1* | 11/2021 | Smith Devine | G06F 21/6227 |
| 11,194,793 | B1* | 12/2021 | Srivastava | G06F 16/2282 |
| 11,397,608 | B2* | 7/2022 | Srinivasan | G06F 40/205 |
| 12,039,258 | B2* | 7/2024 | Dayal | G06F 40/205 |
| 2008/0244508 | A1* | 10/2008 | Mantuano | G06F 8/36 |
|  |  |  |  | 717/106 |
| 2012/0054590 | A1* | 3/2012 | Oh | G06F 30/20 |
|  |  |  |  | 715/212 |
| 2014/0380139 | A1* | 12/2014 | Mondri | G06F 40/18 |
|  |  |  |  | 715/212 |
| 2015/0254226 | A1* | 9/2015 | Renshaw | G06F 40/18 |
|  |  |  |  | 715/219 |
| 2016/0173541 | A1* | 6/2016 | Gusain | H04L 65/403 |
|  |  |  |  | 715/212 |
| 2017/0228357 | A1* | 8/2017 | Hirzel | G06F 40/18 |
| 2018/0157467 | A1* | 6/2018 | Stachura | G06F 8/38 |
| 2019/0369849 | A1* | 12/2019 | Gonzalez | G06T 1/20 |
| 2020/0004799 | A1* | 1/2020 | Gross | G06F 17/11 |
| 2020/0004812 | A1* | 1/2020 | Gross | G06F 40/18 |
| 2020/0042588 | A1* | 2/2020 | Sagalovskiy | G06F 8/427 |
| 2020/0248694 | A1* | 8/2020 | Lee | F04D 29/4286 |
| 2020/0285694 | A1 | 9/2020 | Nield |  |
| 2021/0357241 | A1* | 11/2021 | Srinivasan | G06F 40/205 |
| 2023/0088670 | A1* | 3/2023 | Isner | G06F 8/425 |
|  |  |  |  | 717/137 |
| 2023/0251958 | A1* | 8/2023 | Vaquier | G06F 8/75 |
|  |  |  |  | 717/124 |
| 2023/0401039 | A1* | 12/2023 | Mathur | G06F 8/33 |
| 2024/0012987 | A1* | 1/2024 | Castañeda-Villagrán | |
|  |  |  |  | G06F 40/186 |
| 2024/0069988 | A1* | 2/2024 | Patel | G06F 9/54 |
| 2024/0070383 | A1* | 2/2024 | Patel | G06F 40/18 |
| 2024/0119229 | A1* | 4/2024 | Fresen | G06F 40/12 |
| 2024/0303422 | A1* | 9/2024 | Fabian | G06F 16/3329 |
| 2025/0061271 | A1* | 2/2025 | Mcdaid | G06F 40/18 |

OTHER PUBLICATIONS

Pamnani, et al., "Microsoft Defender Application Guard overview", Retrieved from: https://learn.microsoft.com/en-us/windows/security/threat-protection/microsoft-defender-application-guard/md-app-guard-overview, May 12, 2023, 4 Pages.

International Search Report and Written Opinion received for PCT Application No. PCT/US2024/040653, Dec. 5, 2024, 17 pages.

International Preliminary Report on Patentability (Chapter I) received for PCT Application No. PCT/US2024/040653, Mar. 5, 2026, 11 pages.

* cited by examiner

File   Edit   Insert   Format   View

310 — py

| | A | B | C | D | E | F | G | H | I | J | K | L | M |
|---|---|---|---|---|---|---|---|---|---|---|---|---|---|
| 1 | | | | | | | | | | | | | |
| 2 | | | | | | | | | | | | | |
| 3 | | Month | Sales | Units | | | | | | | | | |
| 4 | | Jan | $1,000 | 27 | | | | | | | | | |
| 5 | | Feb | $1,275 | 33 | | | | | | | | | |
| 6 | | Mar | $1,100 | 30 | | | | | | | | | |
| 7 | | Apr | $1,500 | 33 | | py | | | | | | | |
| 8 | | May | $2,500 | 64 | | | | | | | | | |
| 9 | | Jun | $2,700 | 73 | | | | | | | | | |
| 10 | | Jul | $3,350 | 90 | | | | | | | | | |
| 11 | | Aug | $5,550 | 156 | | | | | | | | | |
| 12 | | Sept | $6,725 | 195 | | | | | | | | | |
| 13 | | Oct | $7,045 | 201 | | | | | | | | | |
| 14 | | Nov | $8,855 | 259 | | | | | | | | | |
| 15 | | Dec | $9,570 | 276 | | | | | | | | | |
| 16 | | | | | | | | | | | | | |
| 17 | | | | | | | | | | | | | |
| 18 | | | | | | | | | | | | | |
| 19 | | | | | | | | | | | | | |
| 20 | | | | | | | | | | | | | |

File   Edit   Insert   Format   View

310 — [ py ]   y = xl("C7")*2

| | A | B | C | D | E | F | G | H | I | J | K | L | M |
|---|---|---|---|---|---|---|---|---|---|---|---|---|---|
| 1 | | | | | | | | | | | | | |
| 2 | | | | | | | | | | | | | |
| 3 | | Month | Sales | Units | | | | | | | | | |
| 4 | | Jan | $1,000 | 27 | | | | | | | | | |
| 5 | | Feb | $1,275 | 33 | | | | | | | | | |
| 6 | | Mar | $1,100 | 30 | | | | | | | | | |
| 7 | | Apr | $1,500 | 33 | | $3,000 | | | | | | | |
| 8 | | May | $2,500 | 64 | | | | | | | | | |
| 9 | | Jun | $2,700 | 73 | | | | | | | | | |
| 10 | | Jul | $3,350 | 90 | | | | | | | | | |
| 11 | | Aug | $5,550 | 156 | | | | | | | | | |
| 12 | | Sept | $6,725 | 195 | | | | | | | | | |
| 13 | | Oct | $7,045 | 201 | | | | | | | | | |
| 14 | | Nov | $8,855 | 259 | | | | | | | | | |
| 15 | | Dec | $9,570 | 276 | | | | | | | | | |
| 16 | | | | | | | | | | | | | |
| 17 | | | | | | | | | | | | | |
| 18 | | | | | | | | | | | | | |
| 19 | | | | | | | | | | | | | |
| 20 | | | | | | | | | | | | | |

Figure 3E:
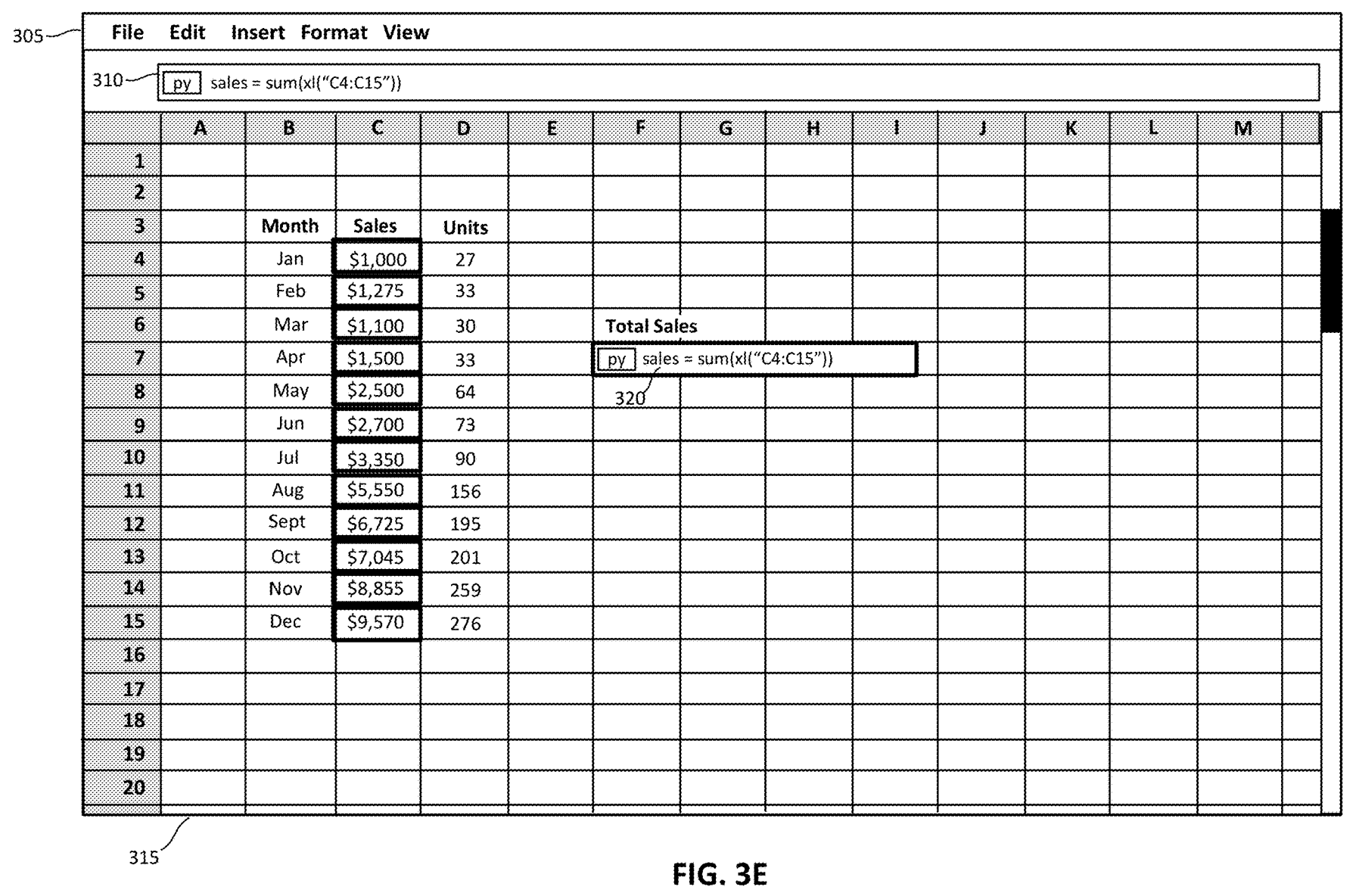

File    Edit    Insert    Format    View

310 — [py] sales = sum(xl("C4:C15"))

|  | A | B | C | D | E | F | G | H | I | J | K | L | M |
|---|---|---|---|---|---|---|---|---|---|---|---|---|---|
| 1 |  |  |  |  |  |  |  |  |  |  |  |  |  |
| 2 |  |  |  |  |  |  |  |  |  |  |  |  |  |
| 3 |  | Month | Sales | Units |  |  |  |  |  |  |  |  |  |
| 4 |  | Jan | $1,000 | 27 |  |  |  |  |  |  |  |  |  |
| 5 |  | Feb | $1,275 | 33 |  |  |  |  |  |  |  |  |  |
| 6 |  | Mar | $1,100 | 30 |  | Total Sales |  |  |  |  |  |  |  |
| 7 |  | Apr | $1,500 | 33 |  | [py] sales = sum(xl("C4:C15")) |  |  |  |  |  |  |  |
| 8 |  | May | $2,500 | 64 |  | 320 |  |  |  |  |  |  |  |
| 9 |  | Jun | $2,700 | 73 |  |  |  |  |  |  |  |  |  |
| 10 |  | Jul | $3,350 | 90 |  |  |  |  |  |  |  |  |  |
| 11 |  | Aug | $5,550 | 156 |  |  |  |  |  |  |  |  |  |
| 12 |  | Sept | $6,725 | 195 |  |  |  |  |  |  |  |  |  |
| 13 |  | Oct | $7,045 | 201 |  |  |  |  |  |  |  |  |  |
| 14 |  | Nov | $8,855 | 259 |  |  |  |  |  |  |  |  |  |
| 15 |  | Dec | $9,570 | 276 |  |  |  |  |  |  |  |  |  |
| 16 |  |  |  |  |  |  |  |  |  |  |  |  |  |
| 17 |  |  |  |  |  |  |  |  |  |  |  |  |  |
| 18 |  |  |  |  |  |  |  |  |  |  |  |  |  |
| 19 |  |  |  |  |  |  |  |  |  |  |  |  |  |
| 20 |  |  |  |  |  |  |  |  |  |  |  |  |  |

Figure 3F:
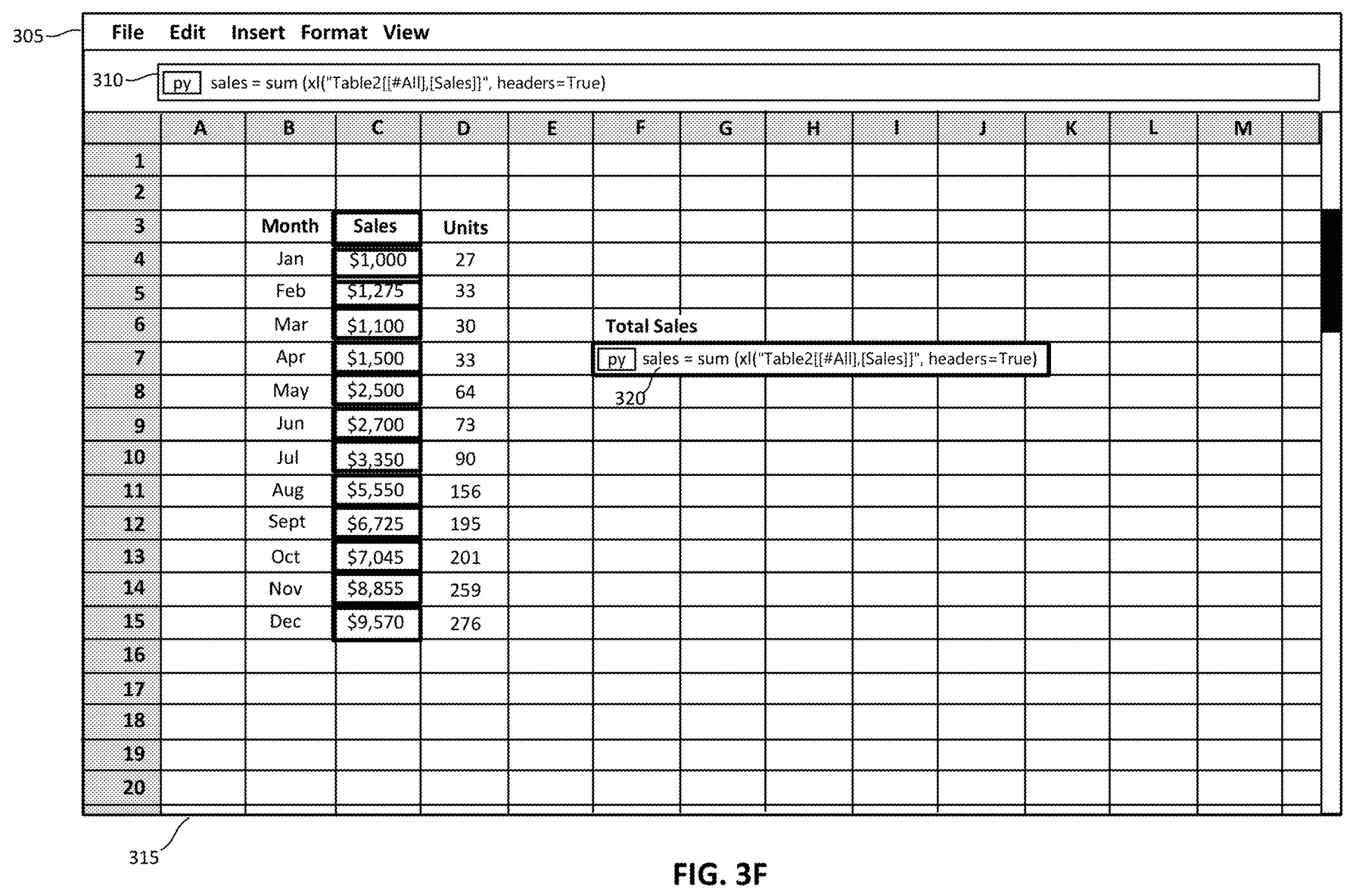

File   Edit   Insert   Format   View

305

310 — py| sales = sum (xl("Table2[[#All],[Sales]]", headers=True)

| | A | B | C | D | E | F | G | H | I | J | K | L | M |
|---|---|---|---|---|---|---|---|---|---|---|---|---|---|
| 1 | | | | | | | | | | | | | |
| 2 | | | | | | | | | | | | | |
| 3 | | Month | Sales | Units | | | | | | | | | |
| 4 | | Jan | $1,000 | 27 | | | | | | | | | |
| 5 | | Feb | $1,275 | 33 | | | | | | | | | |
| 6 | | Mar | $1,100 | 30 | | Total Sales | | | | | | | |
| 7 | | Apr | $1,500 | 33 | | py\| sales = sum (xl("Table2[[#All],[Sales]]", headers=True) | | | | | | | |
| 8 | | May | $2,500 | 64 | | | | | | | | | |
| 9 | | Jun | $2,700 | 73 | | | 320 | | | | | | |
| 10 | | Jul | $3,350 | 90 | | | | | | | | | |
| 11 | | Aug | $5,550 | 156 | | | | | | | | | |
| 12 | | Sept | $6,725 | 195 | | | | | | | | | |
| 13 | | Oct | $7,045 | 201 | | | | | | | | | |
| 14 | | Nov | $8,855 | 259 | | | | | | | | | |
| 15 | | Dec | $9,570 | 276 | | | | | | | | | |
| 16 | | | | | | | | | | | | | |
| 17 | | | | | | | | | | | | | |
| 18 | | | | | | | | | | | | | |
| 19 | | | | | | | | | | | | | |
| 20 | | | | | | | | | | | | | |

| | A | B | C | D | E | F | G | H | I | J | K | L | M |
|---|---|---|---|---|---|---|---|---|---|---|---|---|---|
| 1 | | | | | | | | | | | | | |
| 2 | | | | | | | | | | | | | |
| 3 | | Month | Sales | Units | | | | | | | | | |
| 4 | | Jan | $1,000 | 27 | | | | | | | | | |
| 5 | | Feb | $1,275 | 33 | | | | | | | | | |
| 6 | | Mar | $1,100 | 30 | | Total Sales | | | | | | | |
| 7 | | Apr | $1,500 | 33 | | $51,170 | | | | | | | |
| 8 | | May | $2,500 | 64 | | | | | | | | | |
| 9 | | Jun | $2,700 | 73 | | | | | | | | | |
| 10 | | Jul | $3,350 | 90 | | | | | | | | | |
| 11 | | Aug | $5,550 | 156 | | | | | | | | | |
| 12 | | Sept | $6,725 | 195 | | | | | | | | | |
| 13 | | Oct | $7,045 | 201 | | | | | | | | | |
| 14 | | Nov | $8,855 | 259 | | | | | | | | | |
| 15 | | Dec | $9,570 | 276 | | | | | | | | | |
| 16 | | | | | | | | | | | | | |
| 17 | | | | | | | | | | | | | |
| 18 | | | | | | | | | | | | | |
| 19 | | | | | | | | | | | | | |
| 20 | | | | | | | | | | | | | |

File   Edit   Insert   Format   View

File  Edit  Insert  Format  View

310

| | A | B | C | D | E | F | G | H |
|---|---|---|---|---|---|---|---|---|
| 1 | | | | | | | | |
| 2 | | | | | | | | |
| 3 | | Month | Sales | Units | | | | |
| 4 | | Jan | $1,000 | 27 | | | | |
| 5 | | Feb | $1,275 | 33 | | | | |
| 6 | | Mar | $1,100 | 30 | | Total Sales | | |
| 7 | | Apr | $1,500 | 33 | | $51,170 | | |
| 8 | | May | $2,500 | 64 | | | | |
| 9 | | Jun | $2,700 | 73 | | | | |
| 10 | | Jul | $3,350 | 90 | | | | |
| 11 | | Aug | $5,550 | 156 | | | | |
| 12 | | Sept | $6,725 | 195 | | | | |
| 13 | | Oct | $7,045 | 201 | | | | |
| 14 | | Nov | $8,855 | 259 | | | | |
| 15 | | Dec | $9,570 | 276 | | | | |
| 16 | | | | | | | | |
| 17 | | | | | | | | |
| 18 | | | | | | | | |
| 19 | | | | | | | | |
| 20 | | | | | | | | |

315

Code Editor

Show All Code ☑

Sheet1[F7]    Show Code ☑ sales = sum(xl("C4:C15"))

340

[ New Code ]    [ Close ]

File   Edit   Insert   Format   View

| | A | B | C | D | E | F | G | H |
|---|---|---|---|---|---|---|---|---|
| 1 | | | | | | | | |
| 2 | | | | | | | | |
| 3 | | Month | Sales | Units | | | | |
| 4 | | Jan | $1,000 | 27 | | | | |
| 5 | | Feb | $1,275 | 33 | | | | |
| 6 | | Mar | $1,100 | 30 | | Total Sales | | |
| 7 | | Apr | $1,500 | 33 | | $51,170 | | |
| 8 | | May | $2,500 | 64 | | | | |
| 9 | | Jun | $2,700 | 73 | | Total Units Sold | | |
| 10 | | Jul | $3,350 | 90 | | 1,437 | | |
| 11 | | Aug | $5,550 | 156 | | | | |
| 12 | | Sept | $6,725 | 195 | | Average Price per Unit | | |
| 13 | | Oct | $7,045 | 201 | | $35.61 | | |
| 14 | | Nov | $8,855 | 259 | | | | |
| 15 | | Dec | $9,570 | 276 | | | | |
| 16 | | | | | | | | |
| 17 | | | | | | | | |
| 18 | | | | | | | | |
| 19 | | | | | | | | |
| 20 | | | | | | | | |

Code Editor

Show All Code ☑

Sheet1[F7]     Show Code ☑ sales = sum(xl("C4:C15"))

Sheet1[F10]     Show Code ☑ units = sum(xl("D4:D15"))

Sheet1[F13]     Show Code ☑ sales = xl("F7")
units = xl("F10")
avg_per_unit = format_currency(sales / units)

New Code     Close

FIG. 3J

File  Edit  Insert  Format  View

| | A | B | C | D | E | F | G | H |
|---|---|---|---|---|---|---|---|---|
| 1 | | | | | | | | |
| 2 | | | | | | | | |
| 3 | | Month | Sales | Units | | | | |
| 4 | | Jan | $1,000 | 27 | | | | |
| 5 | | Feb | $1,275 | 33 | | | | |
| 6 | | Mar | $1,100 | 30 | | Total Sales | | |
| 7 | | Apr | $1,500 | 33 | | $51,170 | | |
| 8 | | May | $2,500 | 64 | | | | |
| 9 | | Jun | $2,700 | 73 | | Total Units Sold | | |
| 10 | | Jul | $3,350 | 90 | | 1,437 | | |
| 11 | | Aug | $5,550 | 156 | | | | |
| 12 | | Sept | $6,725 | 195 | | Average Price per Unit | | |
| 13 | | Oct | $7,045 | 201 | | $35.61 | | |
| 14 | | Nov | $8,855 | 259 | | | | |
| 15 | | Dec | $9,570 | 276 | | | | |
| 16 | | | | | | | | |
| 17 | | | | | | | | |
| 18 | | | | | | | | |
| 19 | | | | | | | | |
| 20 | | | | | | | | |

Code Editor

Show All Code  ☑

Sheet1[F7]                     Show Code ☑ sales = sum(xl("C4:C15"))

Sheet1[F10]                    Show Code ☑ units = sum(xl("D4:D15"))

Sheet1[F13]             Show Code Output ☑

$35.61

New Code        Close

Figure 3L:
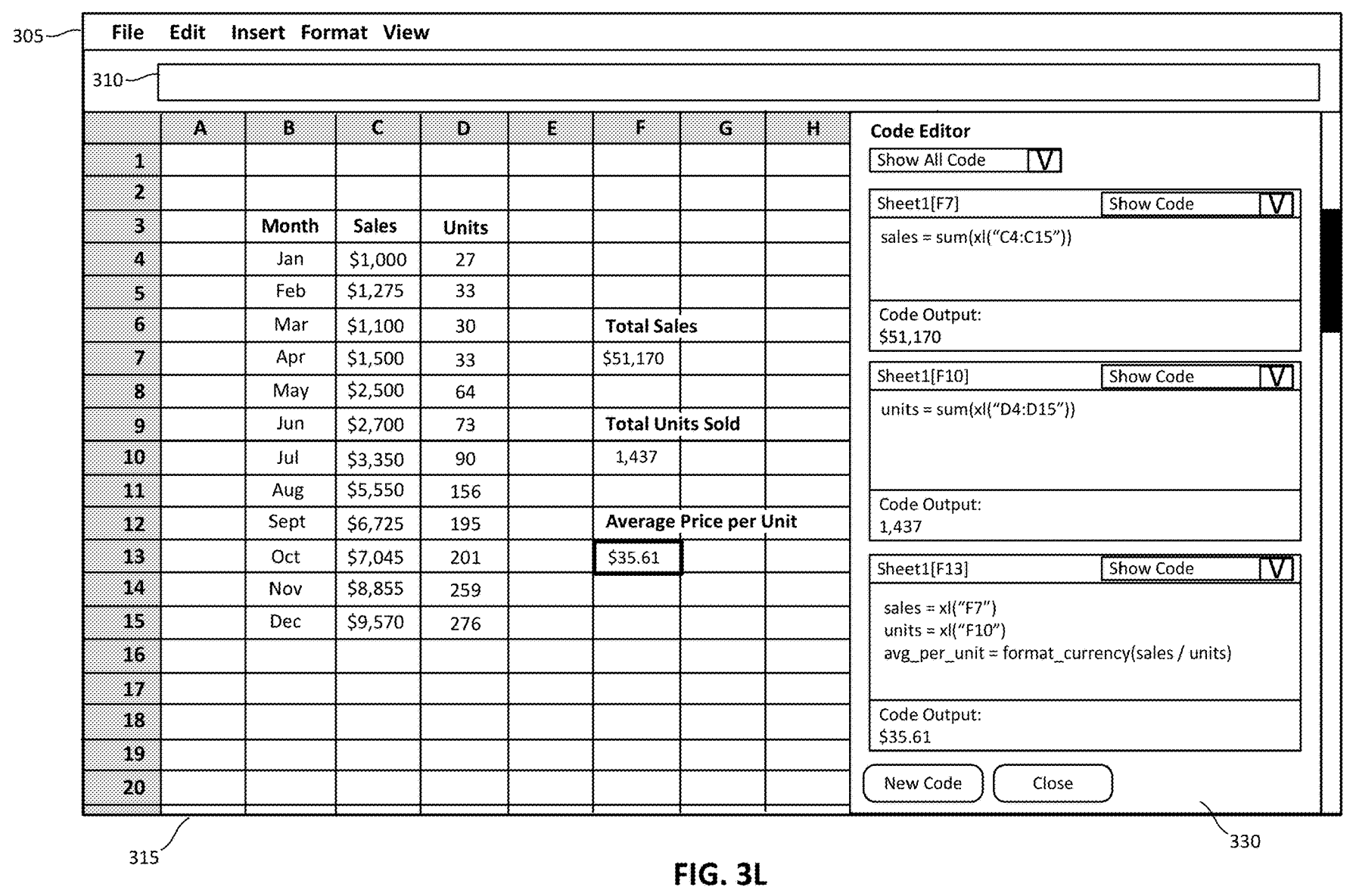

File    Edit    Insert    Format    View

| | A | B | C | D | E | F | G | H |
|---|---|---|---|---|---|---|---|---|
| 1 | | | | | | | | |
| 2 | | | | | | | | |
| 3 | | Month | Sales | Units | | | | |
| 4 | | Jan | $1,000 | 27 | | | | |
| 5 | | Feb | $1,275 | 33 | | | | |
| 6 | | Mar | $1,100 | 30 | | Total Sales | | |
| 7 | | Apr | $1,500 | 33 | | $51,170 | | |
| 8 | | May | $2,500 | 64 | | | | |
| 9 | | Jun | $2,700 | 73 | | Total Units Sold | | |
| 10 | | Jul | $3,350 | 90 | | 1,437 | | |
| 11 | | Aug | $5,550 | 156 | | | | |
| 12 | | Sept | $6,725 | 195 | | Average Price per Unit | | |
| 13 | | Oct | $7,045 | 201 | | $35.61 | | |
| 14 | | Nov | $8,855 | 259 | | | | |
| 15 | | Dec | $9,570 | 276 | | | | |
| 16 | | | | | | | | |
| 17 | | | | | | | | |
| 18 | | | | | | | | |
| 19 | | | | | | | | |
| 20 | | | | | | | | |

Code Editor

Show All Code ☑

Sheet1[F7]    Show Code ☑ sales = sum(xl("C4:C15"))

Code Output:
$51,170

Sheet1[F10]    Show Code ☑ units = sum(xl("D4:D15"))

Code Output:
1,437

Sheet1[F13]    Show Code ☑ sales = xl("F7")
units = xl("F10")
avg_per_unit = format_currency(sales / units)

Code Output:
$35.61

New Code        Close

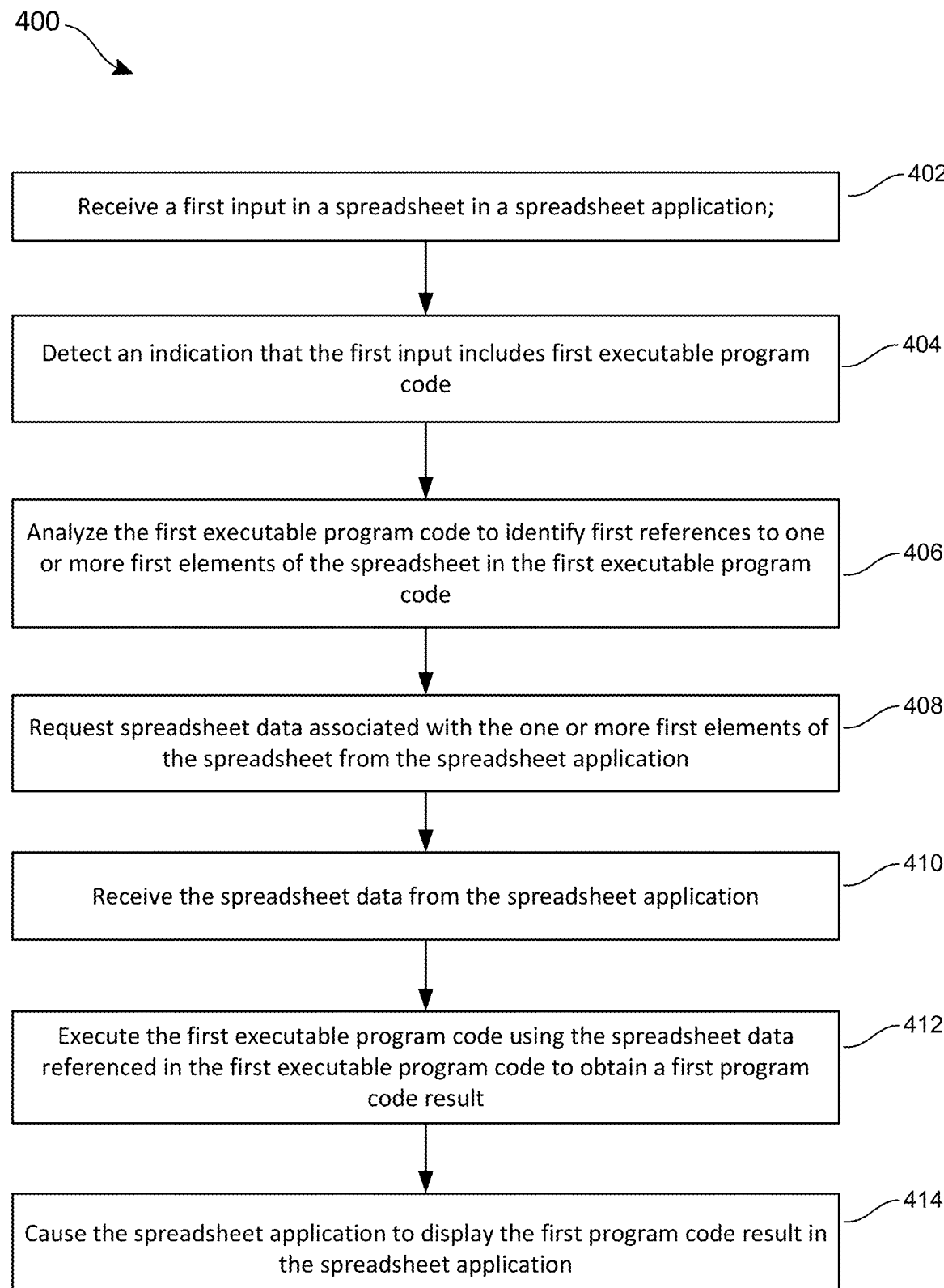

402 — Receive a first input in a spreadsheet in a spreadsheet application;

404 — Detect an indication that the first input includes first executable program code 406 — Analyze the first executable program code to identify first references to one or more first elements of the spreadsheet in the first executable program code 408 — Request spreadsheet data associated with the one or more first elements of the spreadsheet from the spreadsheet application 410 — Receive the spreadsheet data from the spreadsheet application 412 — Execute the first executable program code using the spreadsheet data referenced in the first executable program code to obtain a first program code result 414 — Cause the spreadsheet application to display the first program code result in the spreadsheet application

FIG. 4

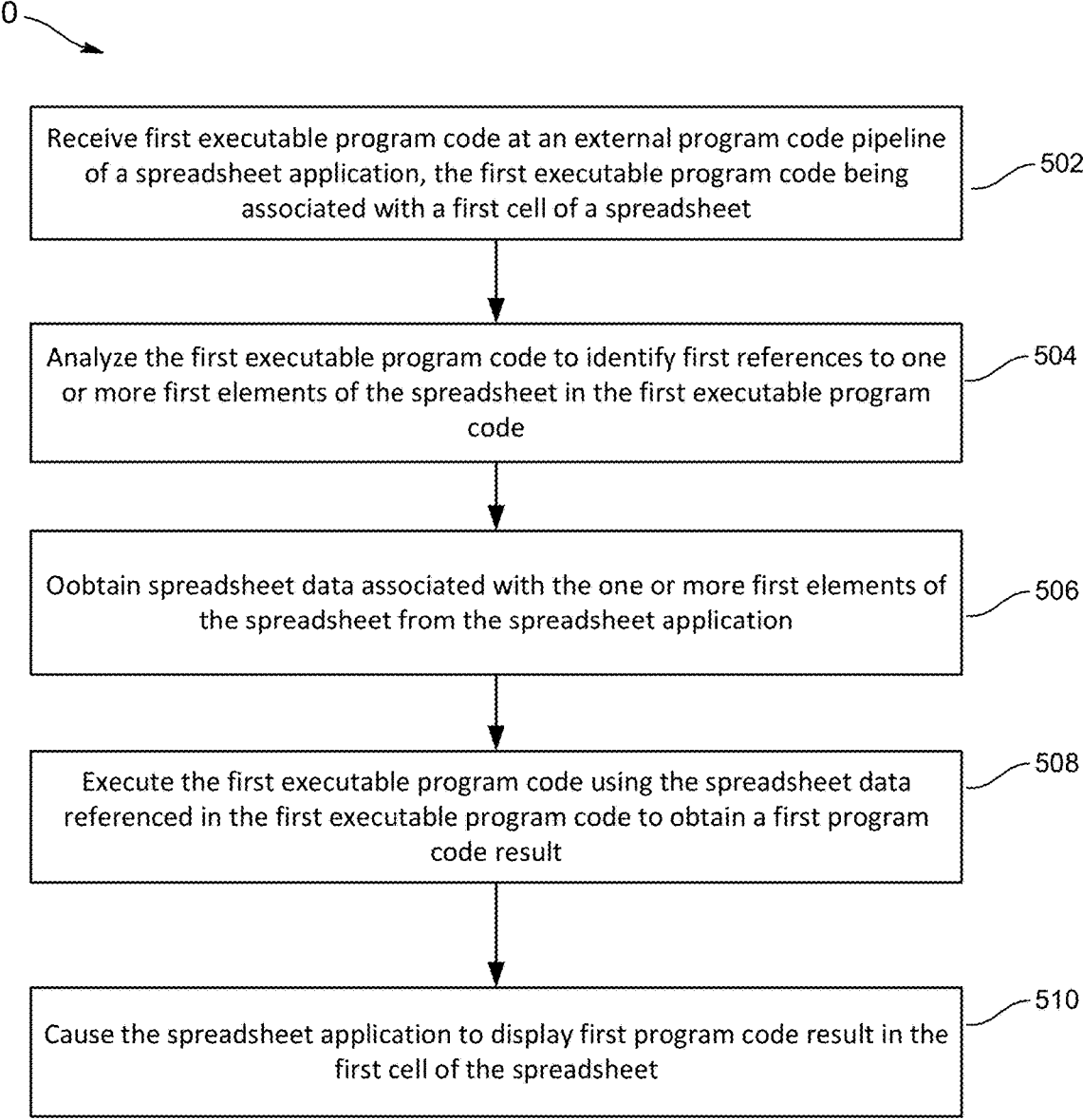

500

Receive first executable program code at an external program code pipeline of a spreadsheet application, the first executable program code being associated with a first cell of a spreadsheet — 502

Analyze the first executable program code to identify first references to one or more first elements of the spreadsheet in the first executable program code — 504

Oobtain spreadsheet data associated with the one or more first elements of the spreadsheet from the spreadsheet application — 506

Execute the first executable program code using the spreadsheet data referenced in the first executable program code to obtain a first program code result — 508

Cause the spreadsheet application to display first program code result in the first cell of the spreadsheet — 510

FIG. 5

INTEGRATING EXTERNAL PROGRAM CODE WITH SPREADSHEET APPLICATION

BACKGROUND

Spreadsheet applications enable users to store data in a two-dimensional array arranged in rows and columns. Moreover, spreadsheet applications provide tools that enable users to store, organize, and analyze data in various ways. For example, spreadsheet applications often include built-in formulas that enable users to manipulate data in various ways. However, uses often wish to perform complex calculations and/or manipulate the data in complex ways that are difficult to implement using built-in formulas due to their limited syntax and inflexibility. To address this problem, some users prefer to utilize an external programming language that enables the user to write executable program code that suites the specific needs of the user. However, current spreadsheet applications do not provide means for integrating such external program code with the spreadsheet application. Neither the programming language nor the spreadsheet provides a native means for referencing spreadsheet objects within the program code. Consequently, such solutions could not be readily integrated with the spreadsheet application to enable users to write and execute external programming code with a spreadsheet in a spreadsheet application. Hence, there is a need for improved systems and methods of integrating executable program code with a spreadsheet application.

SUMMARY

An example data processing system according to the disclosure may include a processor and a machine-readable medium storing executable instructions. The instructions when executed cause the processor alone or in combination with other processors to perform operations including receiving a first input in a spreadsheet in a spreadsheet application; detecting an indication that the first input includes first executable program code; analyzing the first executable program code to identify first references to one or more first elements of the spreadsheet in the first executable program code; spreadsheet data associated with the one or more first elements of the spreadsheet from the spreadsheet application; receiving the spreadsheet data from the spreadsheet application; executing the first executable program code using the spreadsheet data referenced in the first executable program code to obtain a first program code result; and causing the spreadsheet application to display the first program code result in the spreadsheet application.

An example method implemented in a data processing system for integrating executable program code with a spreadsheet application includes receiving a first input in a spreadsheet in the spreadsheet application; detecting an indication that the first input includes first executable program code; analyzing the first executable program code to identify first references to one or more first elements of the spreadsheet in the first executable program code; requesting spreadsheet data associated with the one or more first elements of the spreadsheet from the spreadsheet application; receiving the spreadsheet data from the spreadsheet application; executing the first executable program code using the spreadsheet data referenced in the first executable program code to obtain a first program code result; and causing the spreadsheet application to display the first program code result in the spreadsheet application.

An example data processing system according to the disclosure may include a processor and a machine-readable medium storing executable instructions. The instructions when executed cause the processor alone or in combination with other processors to perform operations including receiving first executable program code at an external program code pipeline of a spreadsheet application, the first executable program code being associated with a first cell of a spreadsheet; analyzing the first executable program code to identify first references to one or more first elements of the spreadsheet in the first executable program code; obtaining spreadsheet data associated with the one or more first elements of the spreadsheet from the spreadsheet application; executing the first executable program code using the spreadsheet data referenced in the first executable program code to obtain a first program code result; and causing the spreadsheet application to display first program code result in the first cell of the spreadsheet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3L are diagrams of example user interfaces of a spreadsheet application that incorporates the techniques provided herein.

FIG. 4 is a flow chart of an example process for integrating executable program code with a spreadsheet application according to the techniques provided herein.

FIG. 5 is a flow chart of another example process for integrating executable program code with a spreadsheet application according to the techniques provided herein.

DETAILED DESCRIPTION

Techniques for integrating executable program code with a spreadsheet application are provided. These techniques provide tools for automatically presenting presentation content using a virtual presenter. These techniques address the technical problems associated with current spreadsheet applications which do not support integration with external program code. The techniques herein implement an external program code pipeline that enables users to input external program code via a user interface provided by the spreadsheet application. The external program code pipeline analyzes the program code to identify references to elements of a spreadsheet, obtains data values associated with these elements from the spreadsheet, replaces the references to the elements in the spreadsheet with the corresponding data values from the spreadsheet, and executes the program code to determine a program code result. The external program code pipeline provides the program code result to the spreadsheet application. The spreadsheet application can then display the result in a user interface of the spreadsheet application and/or perform other actions on the program code result. The program code is executed in a hypervisor isolated container implemented by the external program code pipeline, which provides the data, libraries, object code, and/or other content used to support the execution of the program code. The hypervisor isolated container also isolates the execution of the program code from the spreadsheet application to prevent users from inputting malicious code that can corrupt the spreadsheet application and/or the spreadsheet and/or perform other malicious actions. The hypervisor isolated container also isolates user data to be prevent unauthorized access by other users. A technical benefit of this approach is that the user is provided with a flexible means for extending the functionality of the spreadsheet application by permitting the user to input executable program code to perform specific actions. These techniques also provide an improved user interface that facilitates the integration of the executable program code with the spreadsheet application. The improved user interface enables user selection of elements of the spreadsheet to be automatically incorporated into the executable program code. The improved user interface also facilitates highlighting of the elements of the spreadsheet that are referenced from a particular section of executable program code. A technical benefit of this approach is that the improved user interface enables the user to quickly identify which elements of the spreadsheet are associated with a selected section of the executable program code. These and other technical benefits of the techniques disclosed herein will be evident from the discussion of the example implementations that follow.

Figure 1:
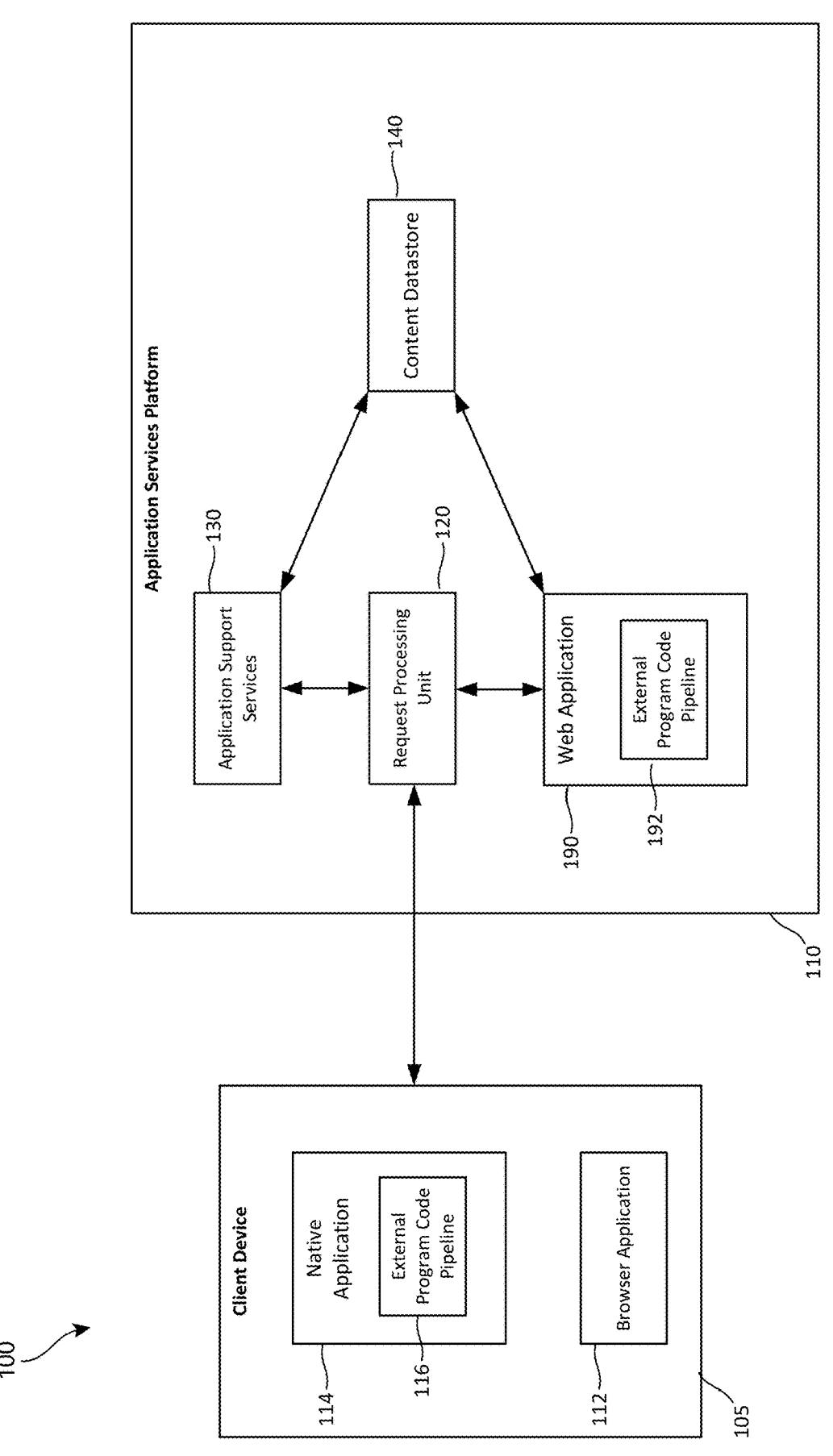
FIG. 1 is a diagram showing aspects of an example computing environment in which the techniques for integrating executable program code with a spreadsheet application is implemented according to the techniques provided herein.

FIG. 1 is a diagram showing aspects of an example computing environment 100 in which the techniques for integrating executable program code with a spreadsheet application are implemented according to the techniques provided herein. The example computing environment includes a client device 105 and an application services platform 110. The application services platform 110 provides one or more cloud-based applications and/or provides services to support one or more web-enabled native applications on the client device 105. These applications may include but are not limited to a spreadsheet application, presentation applications, word processing applications, web site authoring applications, collaboration platforms, communications platforms, and/or other types of applications in which users may create, view, and/or modify various types of electronic content. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device, other implementations may include a different number of client devices that utilize service provided by the application services platform 110.

The client device 105 includes a native application 114 and a browser application 112. The native application 114 is a web-enabled native application, in some implementations, that enables users to view, create, and/or modify electronic content. The web-enabled native application utilizes services provided by the application services platform 110 including but not limited to creating, viewing, and/or modifying various types of electronic content and obtaining templates for creating and/or modifying the electronic content. In some implementations, the native application 114 implements a spreadsheet application, and this spreadsheet application implements the techniques for integrating executable program code with a spreadsheet application. The native application implements the user interface 305 shown in FIGS. 3A-3L in some implementations. In other implementations, the browser application 112 is used for accessing and viewing web-based content provided by the application services platform 110. In such implementations, the application services platform 110 implements one or more web applications, such as the web application 190, that enables users to view, create, and/or modify electronic content and to obtain template recommendations for creating and/or modifying the electronic content. In some implementations, the web application 190 implements a spreadsheet application, and this spreadsheet application implements the techniques for integrating executable program code with a spreadsheet application. The web application implements the user interface 305 shown in FIGS. 3A-3L in some implementations. The application services platform 110 supports both web-enabled native applications and a web application in some implementations, and the users may choose which approach best suits their needs. The spreadsheet application is Microsoft Excel® in some implementations, while other implementations may be implemented using a different spreadsheet application.

The application services platform 110 includes a request processing unit 120, the web application 190, the application support services 130, and the content datastore 140. The request processing unit 120 is configured to receive requests from the native application 114 of the client device 105 and/or the web application 190 of the application services platform 110. The requests may include but are not limited to requests to create, view, and/or modify various types of electronic content including spreadsheets. The request processing unit 120 also coordinates communication and exchange of data among components of the application services platform 110 as discussed in the examples which follow. The application support services 130 provide various services, such as but not limited to content moderation, content generation with one or more generative models, writing assistance features for improving grammar and/or spelling, and/or other services that support the functionality provided by the native application 114 and/or the web application 190. The content datastore 140 is a persistent datastore that stores various types of electronic content that can be utilized by the application support services 130 and/or the web application 190 to support the functionality of the application support services 130 and/or the web application 190.

The native application 114 includes an external program code pipeline 116 and the web application 190 includes an external program code pipeline 192. The external code program pipelines are configured to support integrating executable program code with a spreadsheet application. The external program code pipelines provide services that enable a user to reference cells, row, columns, tables, and/or other entities in a spreadsheet in external program code, to utilize data associated with these entities in the external program code, to execute the external program code, and to provide program code results that can be integrated with the spreadsheet. The external program code pipeline may support one or more interpreted or compiled program languages that may be used to extend the functionality of the spreadsheet application. The one or more program languages do not include native support for referencing cells or other elements of a spreadsheet, such as the spreadsheets associated with the native application 114 and/or the web application 190. Furthermore, the native application 114 and/or the web application 190 do not provide native support for users to utilize the one or more programming languages to extend the functionality of the spreadsheets by adding program code to the spreadsheet. The external program code pipelines provide a means for the native application 114 and/or the web application 190 to support the integration of such external program code with a spreadsheet. The external program code pipeline implements a hypervisor isolated container in which the external program code can be executed in an application, such as the native application 114 or the web application 190. The program code results may vary from implementation to implementation and may include but are not limited to calculation results, textual content, imagery, charts, tables, plots, and/or other types of content that may be generated based on the data obtained from the entities referenced in the external program code. The one or more programming languages that are supported by the external program code pipeline may vary from implementation to implementation. The non-limiting examples which follow show implementations in which the external programming code pipeline supports the Python programming language. However, other implementations may support other programming languages in addition to and/or instead of Python. FIGS. 3A-3L, which are described in detail in the examples which follow, show some examples of executable program code referencing elements of a spreadsheet and the results from the executable program code being integrated with the spreadsheet.

Figure 2:
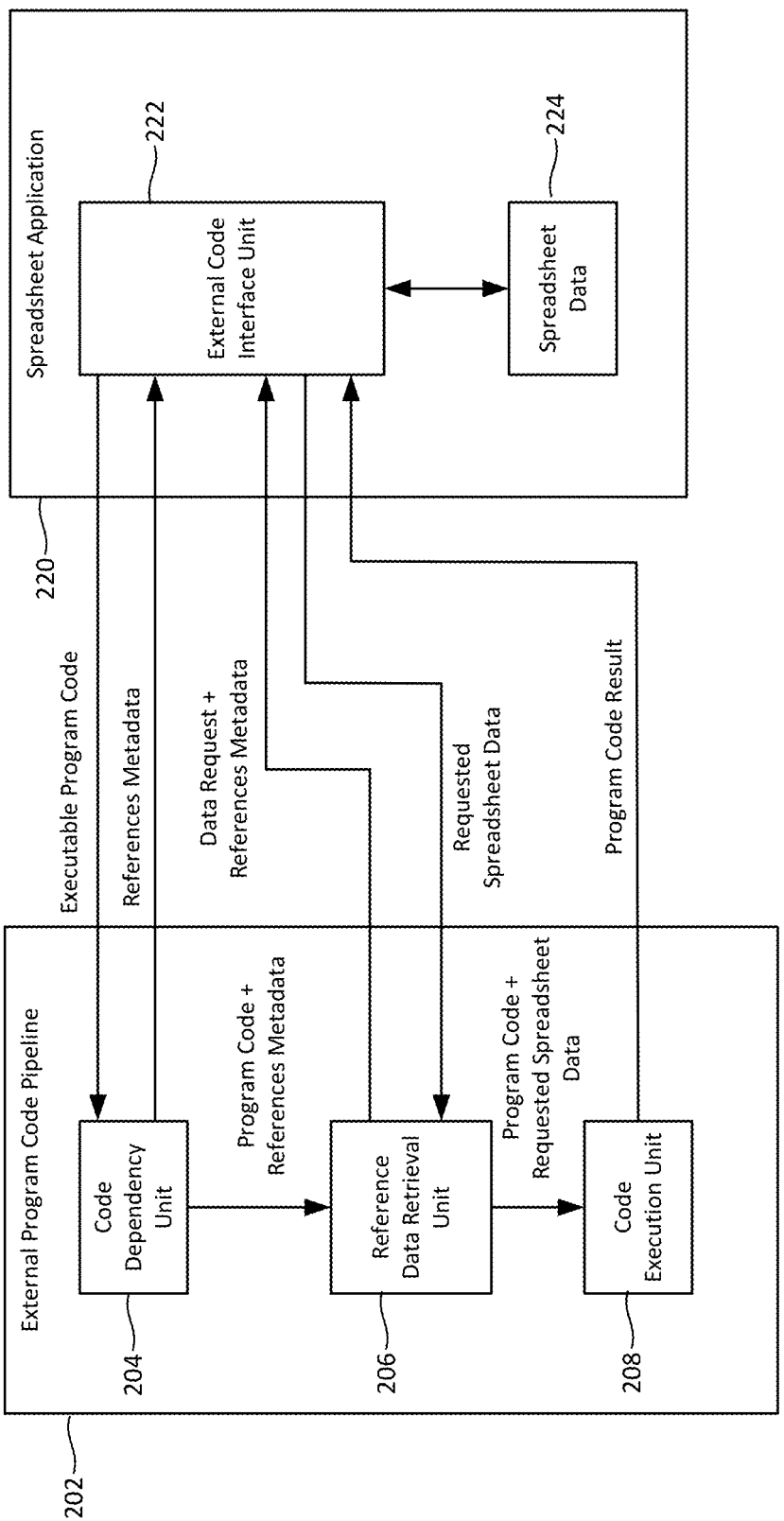
FIG. 2 is a diagram showing additional features of an external program code pipeline that may be used to implement the externa program code pipelines shown in FIG. 1.

An example implementation of an external program code pipeline is shown in FIG. 2, which provides additional details of how the external program code pipeline 202 operates with a spreadsheet application 220 to integrate executable program code with a spreadsheet. The external program code pipeline 202 is used to implement the external program code pipeline 116 of the native application 114 and/or the external program code pipeline 192 of the web application 190 in some implementations. The spreadsheet application 220 is implemented by the native application 114 and/or the web application 190 in some implementations.

The external program code pipeline 202 includes a code dependency unit 204, a reference data retrieval unit 206, and a code execution unit 208. The spreadsheet application 220 includes an external code interface unit 222 which provides an interface between the external program code pipeline 202 and the spreadsheet data 224 which includes data associated with one or more spreadsheets. As discussed in the preceding examples, the external program code pipeline 202 implements the external program code pipeline 116 of the native application 114 and/or the external program code pipeline 192 of the web application 190. Furthermore, while the external program code pipeline 202 is shown as being separate from the spreadsheet application 220, the spreadsheet application 220 implements the external program code pipeline 202 in some implementations. In other implementations, the external program code pipeline 202 is implemented as an add-on or plug-in to the spreadsheet application 220.

The code dependency unit 204 receives external program code from the external code interface unit 222 of the spreadsheet application 220. The external code interface unit 222 also provides spreadsheet metadata with the executable program code in some implementations. The spreadsheet metadata may include information indicative of the size of the spreadsheet, a name of the spreadsheet, and references to one or more objects included in the spreadsheet. As will be discussed in greater detail with respect to the examples shown in FIGS. 3A-3L, the spreadsheet application provides a user interface that enables the user to input the executable program code. The user may trigger the spreadsheet to present the user interface in response to the user activating a control on the spreadsheet application and/or the user entering a predetermined keyword or string indicating that the user is entering executable program code. The external code interface unit 222 provides the executable program code to the code dependency unit 204 of the external program code pipeline 202 for analysis.

The code dependency unit 204 analyzes the text of the external program code to identify references to one or more elements of the spreadsheet in the executable program code. The reference may be to one or more cells, rows, columns, tables, and/or other entities in a spreadsheet. The code dependency unit 204 identifies certain keywords or other indicators in the program code that indicate that the executable program code is referencing an entity in the spreadsheet. Examples of some of the types of keywords or other indicators that may be recognized by the code dependency unit 204 are described in detail with respect to the examples shown in FIGS. 3A-3L. The code dependency unit 204 provides the program code and the references metadata to the reference data retrieval unit 206. The references metadata includes an indication of the references to the one or more elements of the spreadsheet that were included in the executable program code.

The reference data retrieval unit 206 provides a data request and the references metadata to the external code interface unit 222 of the spreadsheet application 220. The external code interface unit 222 parses the metadata and obtains the referenced data from the spreadsheet data 224. The external code interface unit 222 provides the requested spreadsheet data to the reference data retrieval unit 206 of the external program code pipeline 202. The requested spreadsheet data includes key-value pairs, each key represents a reference to one or more elements of the spreadsheet and the corresponding value of the referenced one or more elements. The external code interface unit 222 provides the executable program code and the spreadsheet data to the code execution unit 208. The code execution unit 208 replaces references to elements of the spreadsheet included in the executable program code with the corresponding data included in the requested spreadsheet data. The code execution unit 208 then executes the updated executable program code in a hypervisor isolated container in the spreadsheet application 220. The hypervisor isolated container includes data, libraries, object code, and/or other content used to support the execution of the program code. The code execution unit 208 interprets or compiles the updated executable program code and executes the program code to obtain a program code result. The program code results may vary from implementation to implementation and may include but are not limited to calculation results, textual content, imagery, charts, tables, plots, and/or other types of content that may be generated based on the data obtained from the entities referenced in the external program code.

Figure 3A:
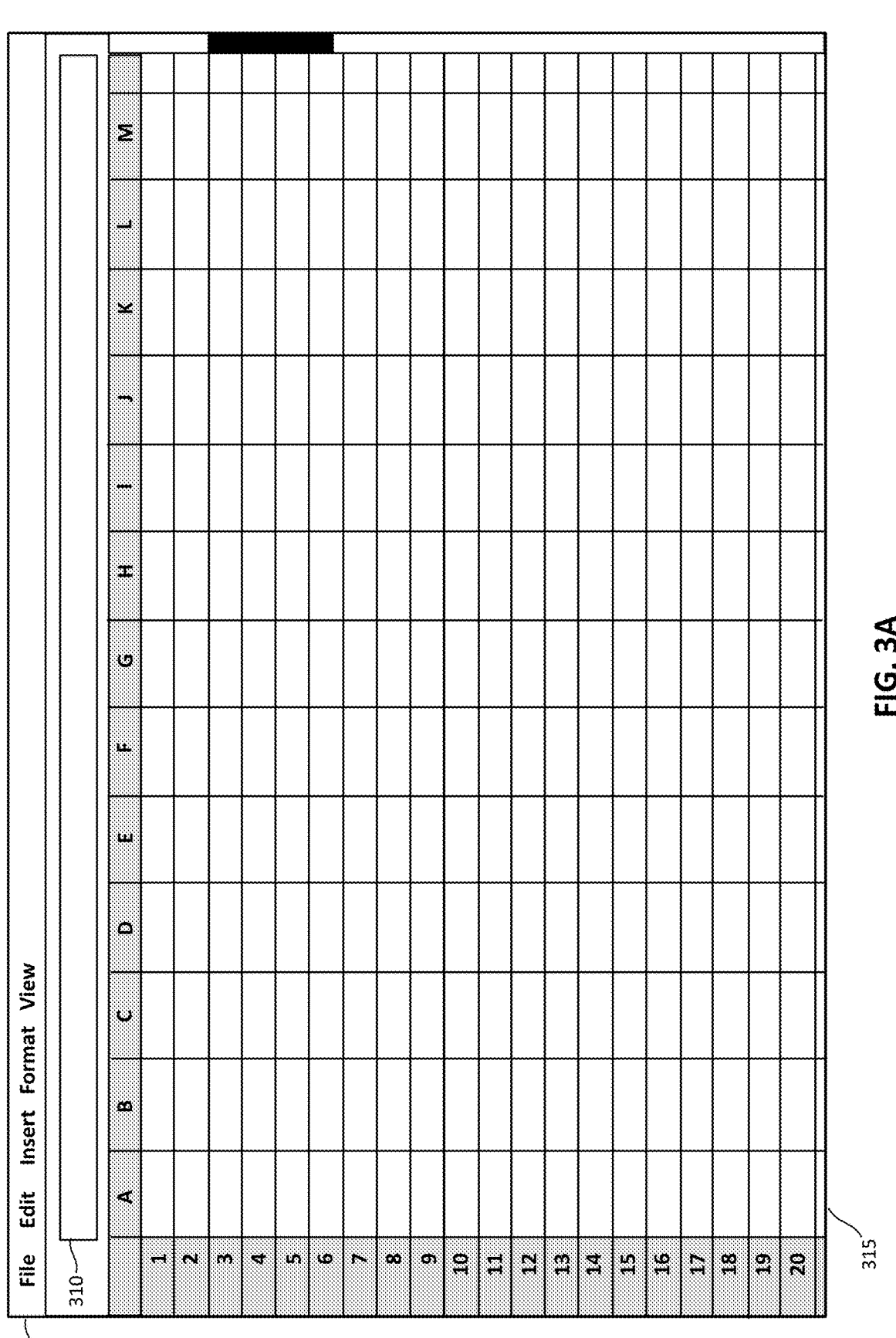

FIGS. 3A-3G are diagrams of example user interfaces of a spreadsheet application that incorporates the techniques provided herein. FIG. 3A shows an example of a user interface 305 of the spreadsheet application 220, which may be implemented by the native application 114 or the web application 190. The user interface 305 includes the spreadsheet pane 315 which shows at least a portion of the contents of a spreadsheet. The user interface 305 includes a data entry bar 310. The data entry bar 310 can be used to edit the contents of a selected cell of the spreadsheet, including editing a formula and/or program code associated with the selected cell of the spreadsheet.

Figure 3C:
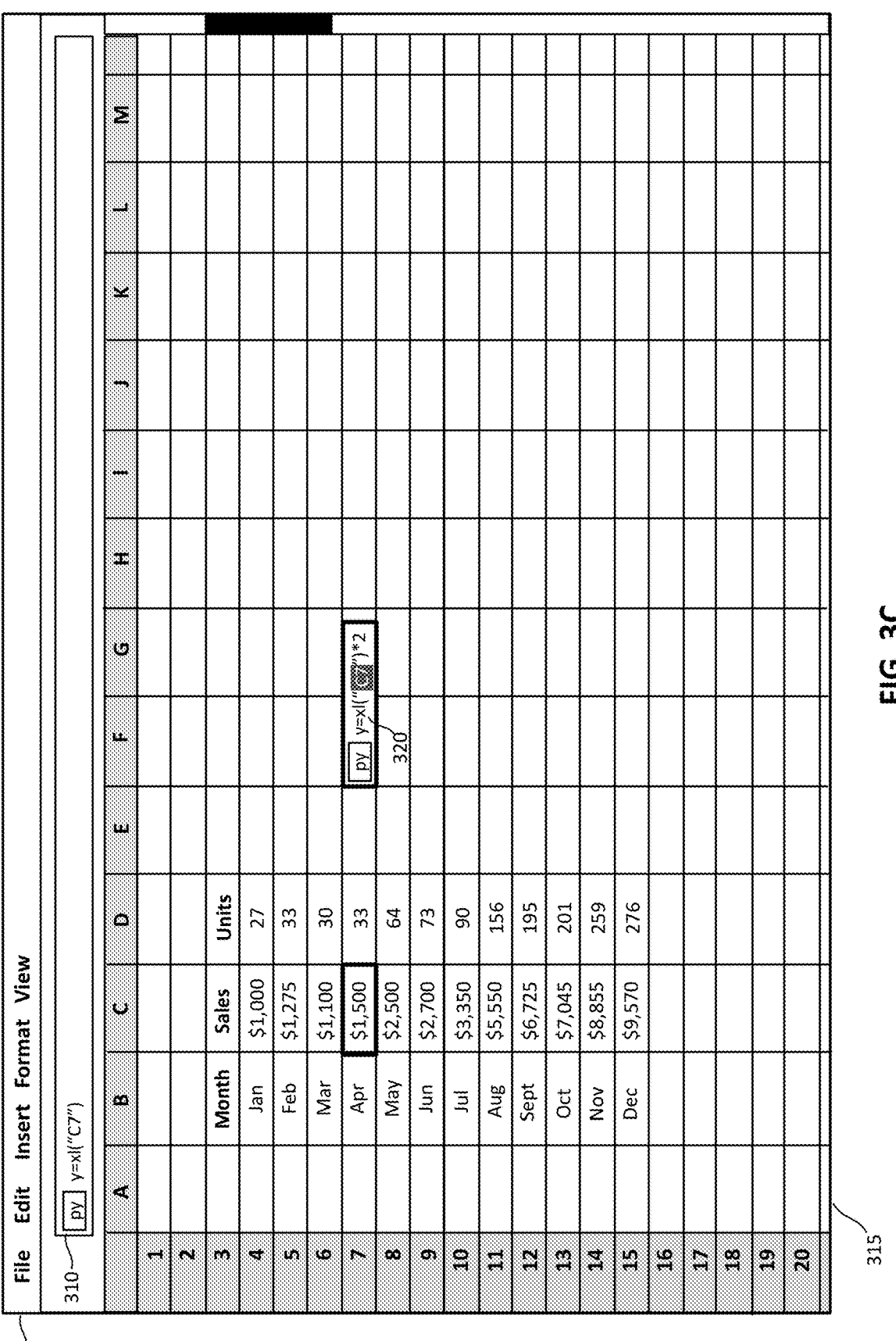
Figure 31:
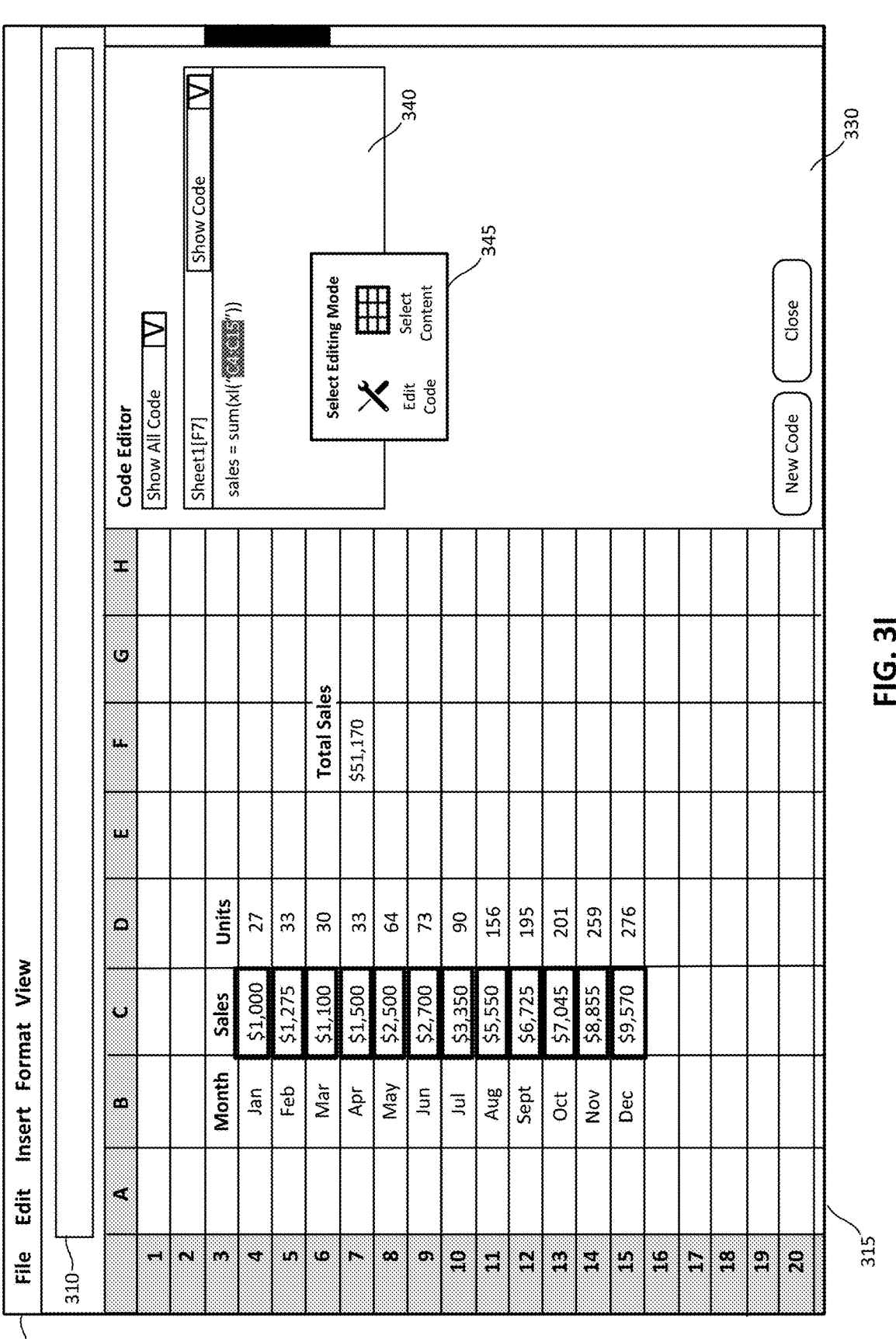

FIG. 3B shows an example of the user interface 305 in which the spreadsheet pane 315 is showing an example spreadsheet. In the example shown in FIG. 3B, the user has selected a cell, referred to as "F7" based on the column and row of the spreadsheet associated with the selected cell. Other spreadsheets may utilize other references to identify the cells included in the spreadsheet. The border of the selected cell has been highlighted to provide a visual indication to the user that the cell is currently selected. In this example, the user has entered the predetermined indicator "py" indicating that the user intends to enter executable program code to be associated with the selected cell of the spreadsheet. The predetermined indicator "py" has been used in this example to cause the spreadsheet application to enter a program code entry mode and to present an editor pane for entering the program code entry mode. The indicator "py" has been used to indicate that the Python programming language is being used herein. The editor pane is shown in the cell in the examples shown in FIGS. 3B and 3C. The editor pane may expand its display area beyond the boundaries of the cell to show the program code if the program code exceeds the display area of the cell. As shown in FIGS. 3B and 3C, the data entry bar 310 is also updated to show an indicator that the spreadsheet application is operating in the program code entry mode and can display the program code associated with the selected cell of the spreadsheet. As discussed in the preceding examples, other programming languages may also be supported, and each programming language may be associated with an indicator that indicates to the spreadsheet application that executable programming code associated with that programming language is being entered in the application. In some implementations, more than one programming language may be supported, and the user enters the appropriate indicator to cause the spreadsheet application to enter the editor mode for that programming language.

In the example shown in FIG. 3C, the user has entered a formula y=xl ("C7"), which includes a reference to the value of the cell "C7" of the cell of the spreadsheet. In FIG. 3C, the text "C7" has been highlighted, indicating that reference to the element of the spreadsheet has been selected and the corresponding element of the spreadsheets are also highlighted. A technical benefit of this approach is that the user may click on, hover a mouse pointer or other pointer over the reference, touch, or otherwise activate a reference included in the text of the executable program code. In some implementations, the external program code pipeline 202 and the spreadsheet application 220 automatically identify references in a selected line of the executable program code and highlight the references to elements of the spreadsheet in the selected line of code and the corresponding elements of the spreadsheet. A technical benefit of this approach is that it provides the user with a visual indication of which elements of the spreadsheet are being utilized by a particular line of program code, so that the user may quickly verify that the references in the executable program code are correct. The external code interface unit 222 of the spreadsheet application 220 determines the selected line of program code based on a position of a cursor or other indicator that indicates a particular line of the program code that the user may be viewing and/or editing.

This dynamic highlighting of references to elements of the spreadsheet in the program code and the corresponding elements of the spreadsheet is supported by the external program code pipeline 202 and the spreadsheet application 220. The external code interface unit 222 sends the selected line of the executable program code to the code dependency unit 204 of the external program code pipeline 202 to identify any references to elements of the spreadsheet application included in the executable program code and to return references metadata to the external code interface unit 222 that identifies the referenced elements. The external code interface unit 222 uses this information to determine which elements of the spreadsheet should be highlighted as well as which text in the executable program code should be highlighted.

Once the user has finished editing the executable program code, the external code interface unit 222 provides the executable program code to the code dependency unit 204 of the external program code pipeline 202 to process and execute the executable program code. The external code interface unit 222 provides the execute program code to the code dependency unit 204 in response to the user clicking on or otherwise activating another cell of the spreadsheet or performing another action that indicates that the user has completed the editing of the executable program code. The external program code pipeline 202 processes the program code as discussed in the preceding examples. In the example implementation shown in FIG. 3C, the user has called a function "xl" which indicates that the parameter of the function is a reference to an element or elements of the spreadsheet. The code dependency unit 204 identifies this function call and recognizes that the parameter of the function call in quotes is a reference to one or more elements of the spreadsheet. In this example, the reference is to a single cell of the spreadsheet but could reference multiple cells, one or more rows or columns, a table, or other entity of the spreadsheet. In this particular example, "xl" is used as the function call because the spreadsheet application 220 is implemented by Microsoft Excel, but other spreadsheet applications may be used, and a different function may be used to cause the code dependency unit 204 to recognize that a reference to a spreadsheet element has been made. The reference data retrieval unit 206 obtains the values of the cell "C7" from the spreadsheet, which is "$1500" in this example. The code execution unit 208 then executes the program code, which in this example multiplies the value of the cell "C7" by 2 to obtain the value "$3,000" as a program code result. The external program code pipeline 202 provides the program code result to the external code interface unit 222 of the spreadsheet application 220. The external code interface unit 222 updates the spreadsheet data 224 with this value. FIG. 3D shows an example in which the spreadsheet shows the program code result in the cell "F7" of the spreadsheet.

Another aspect of the examples shown in FIG. 3C is that the spreadsheet application highlights the cell "C7" in response to the user including the reference to the cell in the executable program code. In such implementations, the external code interface unit 222 receives the references metadata from the reference data retrieval unit 206, and the external code interface unit 222 causes the spreadsheet application 220 to highlight the cells or other elements referenced in the field. The external code interface unit 222 can send the executable program code to the external program code pipeline 202 as the user is inputting the executable program code to obtain the references metadata so that the appropriate elements of the spreadsheet can be highlighted. In other implementations, the one or more elements of the spreadsheet are highlighted in response to the user clicking on, hovering a mouse pointer over, touching, or otherwise activating the text of the program code that is a reference. For example, the user may click on or otherwise activate the "C7" reference included in the executable program code in the editor pane 320, which causes the corresponding cell to be highlighted on the spreadsheet. In the example implementation shown in FIG. 3C, highlighting is implemented by providing a bold border around the cell "C7" in the spreadsheet pane 315. Other types of highlighting including but not limited to changing a color of the text and/or back of the cell and/or other visual indications can be utilized to visualize the highlighting of the cells or other elements of the spreadsheet.

FIG. 3E shows another example of the user interface 305 in which the program code shown in the editor pane 320 associated with cell "F7" references a range of cells in the spreadsheet shown in the spreadsheet pane 315. The range of cells of the spreadsheet referenced in the executable program code have been highlighted.

FIG. 3F shows yet another example of the user interface 305 in which the program code includes a reference to a column of a table instead of referencing specific cells. The code dependency unit 204 recognizes that the program code includes a reference to a column of a table, and the reference data retrieval unit 206 requests the data from this column from the external code interface unit 222 of the spreadsheet application 220. The external code interface unit 222 highlights the cells of the spreadsheet that are included in the column of the table. FIG. 3G shows an example in which the spreadsheet shows the program code result in the cell "F7" of the spreadsheet. The example shown in FIG. 3F also shows another aspect of the programming language implementations. The "xl" function can accept various flags as parameters. The flags can be used to provide context to the code dependency unit 204 and/or the reference data retrieval unit 206 when determining which data to obtain from the external code interface unit 222. In the example shown in FIG. 3F, a flag indicates that the table referenced as a parameter includes a header. This contextual information is useful when determining which cells of the spreadsheet include data.

The native application 114 and/or the web application 190 also includes a mechanism for analyzing the objects referenced in the code, which may include a cell or range of cells, a table, a row or rows of the table, a column or columns of the table, and/or other elements of the spreadsheet. The external program code pipeline 202 analyzes the external program code to determine whether to insert a flag into the xl function call. For example, if the external program code pipeline 202 determines that a table includes a header, a "headers=True" flag can be automatically inserted into the function call. Other types of flags may be added for other types of entities to provide context with the function call to be executed. To illustrate this concept, if the user were to select cells "C15" to "C4" in the example shown in FIG. 3F, the external program code pipeline 202 determines that the function call "xl("Table2[Sales]")" should be inserted in the program code being edited for a particular cell of the spreadsheet. However, if the user were to extend the selection from "C15" to "C3" the external program code pipeline 202 determines that the function call "xl("Table2[[#All], [Sales]]", headers=True)" should be inserted into the program code being edited. The external program code pipeline 202 determines this by analyzing the selected object in the spreadsheet and identifying that the first row selected in the table corresponds to a header. A technical benefit of this approach is that the user does not need to analyze the object selected in the spreadsheet and make a determination whether or not to include one or more flags. Instead, the program code associated with the selection and the appropriate flags are automatically added to the program code.

While the example shown in FIG. 3F shows the user inputting the program code function call, the native application 114 and/or the web application 190 can support other mechanisms for inserting the external code into the spreadsheet. One such mechanism automatically inserts the external program code in response to user selecting one or more cells of the spreadsheet or selecting one or more other elements of the spreadsheet. As discussed in the examples which follow, the user may switch the user interface 305 between a code editing mode and a content selection mode. While in the content selection mode, the user may select one or more cells or other elements of the spreadsheet, and the corresponding code is automatically generated by the native application 114 or the web application 190.

FIGS. 3H-3L shows additional examples of the user interface 220 which can be implemented by the spreadsheet application 220. In FIGS. 3H-3L, the interface 305 includes a control that causes the spreadsheet application 220 to display the code editor panel 330 to be displayed in some implementations. In other implementations, the spreadsheet application 220 automatically displays the code editor panel 330 in response to determining that the user is entering program code. The spreadsheet application 220 displays code editor panel 330 in response to other types of events related to external program code, such as but not limited to the execution of the program code throwing an exception. The spreadsheet application 220 displays the code editor panel 330 in response to the exception and displays the external program code that threw the exception.

The code editor panel 330 presents an editor pane, such as the editor pane 340, for each of the cells that are associated with the executable program code. In the example shown in FIG. 3H, the executable program code is associated with the cell "F7" of the spreadsheet. The executable program code calculates the sum of the values of the cells from the sales column of the table in the spreadsheet. FIG. 3I shows an example in which the range of cells referenced in the executable program code has been clicked on or otherwise activated by the user and the corresponding cells of the spreadsheet have been highlighted in the spreadsheet pane 315. The program code results representing the sum of the range of cells referenced in the executable program code are shown in the cell "F7" of the spreadsheet.

FIG. 3I also shows an example of highlighting functionality that may be implemented in the code editor panel 330. The code editor panel 330 provides the means for the user to switch between a code editing mode and a content selection mode in some implementations. The code editor panel 330 includes a control for switching between the code editing mode and the content selection mode in some implementations. The code editor panel 330 is configured to switch between the code editing mode and the content selection mode in response to a predetermined keypress or combination of keypresses. The example implementation shown in FIG. 3I includes a select editing mode pane 345 that is presented in response to the user clicking on or selecting a reference to a spreadsheet element and/or inputting a formula that includes such a reference. The select editing mode pane 345 includes a first icon, which when activated, causes the spreadsheet application to operate in the code editing mode and a second icon, which when activated, causes the spreadsheet application to operate in the content selection model. In the code editing mode, the code editor panel 330 is configured to receive textual inputs in one or more code editor panes. References in the executable program code and the corresponding elements of the spreadsheet may be highlighted using the dynamic highlighting techniques discussed above with respect to FIG. 3C. In the content selection mode, the code editor panel 330 enables the user to select one or more elements of the spreadsheet and the corresponding references are added to the executable program code being edited in a code editor pane of the code editor panel 330. The user can switch the code editor panel 330 from the code editor mode to the content selection mode while editing a line of executable program code. The user can then select the one or more elements of the spreadsheet. The spreadsheet application 220 then provides the reference information for the selected one or more elements to the code editor panel 330 to insert into the line of executable program code being edited. In the non-limiting example shown in FIG. 3J, the user switches the code editor panel 330 from the code editing mode to content selection mode. The user then selects the range of cells from C4 to C15. The spreadsheet application 220 then automatically populates this selection in the line of program code. The user then switches the code editor panel 330 back to the code editor mode to finish editing the program code. A technical benefit of this approach is that the user can directly select those elements of the spreadsheet in the spreadsheet itself rather than having to manually determine the relevant elements of the spreadsheet and manually input the references to those elements of the spreadsheet into the executable program code. Furthermore, the user can update references to spreadsheet elements directly in the executable program code, and the corresponding selection is automatically updated in the spreadsheet. The spreadsheet application 220 provides the ability to switch between the code editing mode and the content selection mode to facilitate both of these means of revising and/or adding references to spreadsheet elements to the executable program code.

FIG. 3J shows another example of the user interface 305 in which multiple cells of the spreadsheet are associated with executable program code. The code editor panel 330 includes a code editor pane for each of cells associated with executable program code. The code editor panes are presented in the order of execution of the executable program code. The order of execution is based on the position in the spreadsheet of each of the cells associated with the executable program code. In the example shown in FIG. 3J, the order of execution is in row major order, which means that the executable program code is executed on a row-by-row basis from left to right based on the position of the cell associated with the executable program code. Other orders of execution may be utilized in other implementations. The code editor panel 330 can also be configured to filter which executable program code is presented. The code editor panel 330 in FIG. 3J is showing all code associated with the spreadsheet. However, the code editor panel 330 may include other options, such as but not limited to showing only the executable program code associated with a selection within the spreadsheet, showing code associated with a current sheet in a spreadsheet that includes multiple sheets, showing code associated with a particular cell, and/or other such filters that may be used to filter which executable program code is presented on the code editor panel 330. A technical benefit of this approach is that the user can filter the executable program code being presented to show only a subset of the executable program code associated with the spreadsheet. This approach allows the user to focus on a particular subset of the program code of interest and to reduce visual clutter on the code editor panel 330 in instances in which the spreadsheet includes a significant amount of executable program code.

FIG. 3K provides another example of the user interface 305 which shows that the editor panes associated with the executable program code can include a control for switching between displaying the executable program code and the program code result associated with the executable program code. In FIG. 3K, the third editor pane has been configured to present the program code result. FIG. 3L provides another example of the user interface 305 which shows an alternate configuration of the editor pane in which the editor pane shows both the executable program code and the program code result.

FIG. 4 is a flow chart of an example process 400 for integrating executable program code with a spreadsheet application according to the techniques provided herein. The process 400 is implemented by the web application 190 of the application services platform 110 and/or the native application 114 of the client device 105 in some implementations.

The process 400 includes an operation 402 of receiving a first input in a spreadsheet in a spreadsheet application. As discussed in the preceding examples, a user may enter an input in a cell of a spreadsheet, in the data entry bar 310, or in the code editor panel 330.

The process 400 includes an operation 404 of detecting an indication that the first input includes first executable program code. As discussed in the preceding examples, the external code interface unit 222 determines that the user has input an indication that the first input includes first executable program code. In a non-limiting example, the user inputs "py" to cause the external code interface unit 222 to recognize that the user is inputting python code. Other indicators may be recognized in other implementations.

The process 400 includes an operation 406 of analyzing the first executable program code to identify first references to one or more first elements of the spreadsheet in the first executable program code. The external code interface unit 222 provides the executable program code to the code dependency unit 204 of the external program code pipeline 202 to obtain references metadata identifying the references to one or more elements of the spreadsheet referenced in the executable program code.

The process 400 includes an operation 408 of requesting spreadsheet data associated with the one or more first elements of the spreadsheet from the spreadsheet application. The reference data retrieval unit 206 of the external program code pipeline 202 obtains the spreadsheet data from the spreadsheet application 220.

The process 400 includes an operation 410 of receiving the spreadsheet data from the spreadsheet application. The external code interface unit 222 of the spreadsheet application 220 obtains the requested spreadsheet data from the spreadsheet data 224 and provides the requested spreadsheet data to the reference data retrieval unit 206.

The process 400 includes an operation 412 of executing the first executable program code using the spreadsheet data referenced in the first executable program code to obtain a first program code result. The reference data retrieval unit 206 provides the executable program code and the requested spreadsheet data to the code execution unit 208. The code execution unit 208 replaces the references in the program code with the spreadsheet data and executes the program code to obtain a program code result.

The process 400 includes an operation 414 of causing the spreadsheet application to display the first program code result in the spreadsheet application. The code execution unit 208 provides the program code result to the external code interface unit 222, and the external code interface unit 222 updates the spreadsheet data 224 associated with the spreadsheet.

FIG. 5 is a flow chart of another example process 500 for integrating executable program code with a spreadsheet application according to the techniques provided herein. The process 500 is implemented by the web application 190 of the application services platform 110 and/or the native application 114 of the client device 105 in some implementations.

The process 500 includes an operation 502 of receiving first executable program code at an external program code pipeline of a spreadsheet application. The first executable program code is associated with a first cell of a spreadsheet. The code dependency unit 204 of the external program code pipeline 202 receives the executable program code and optional metadata from the external code interface unit 222 of the spreadsheet application 220.

The process 500 includes an operation 504 of analyzing the first executable program code to identify first references to one or more first elements of the spreadsheet in the first executable program code. The external code interface unit 222 provides the executable program code to the code dependency unit 204 of the external program code pipeline 202 to obtain references metadata identifying the references to one or more elements of the spreadsheet referenced in the executable program code.

The process 500 includes an operation 506 of obtaining spreadsheet data associated with the one or more first elements of the spreadsheet from the spreadsheet application. The external code interface unit 222 of the spreadsheet application 220 obtains the requested spreadsheet data from the spreadsheet data 224 and provides the requested spreadsheet data to the reference data retrieval unit 206.

The process 500 includes an operation 508 of executing the first executable program code using the spreadsheet data referenced in the first executable program code to obtain a first program code result. The reference data retrieval unit 206 provides the executable program code and the requested spreadsheet data to the code execution unit 208. The code execution unit 208 replaces the references in the program code with the spreadsheet data and executes the program code to obtain a program code result.

The process 500 includes an operation 510 of causing the spreadsheet application to display first program code result in the first cell of the spreadsheet. The code execution unit 208 provides the program code result to the external code interface unit 222, and the external code interface unit 222 updates the spreadsheet data 224 associated with the spreadsheet. The spreadsheet pane 315 is also updated to present the program code result in the first cell of the spreadsheet.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
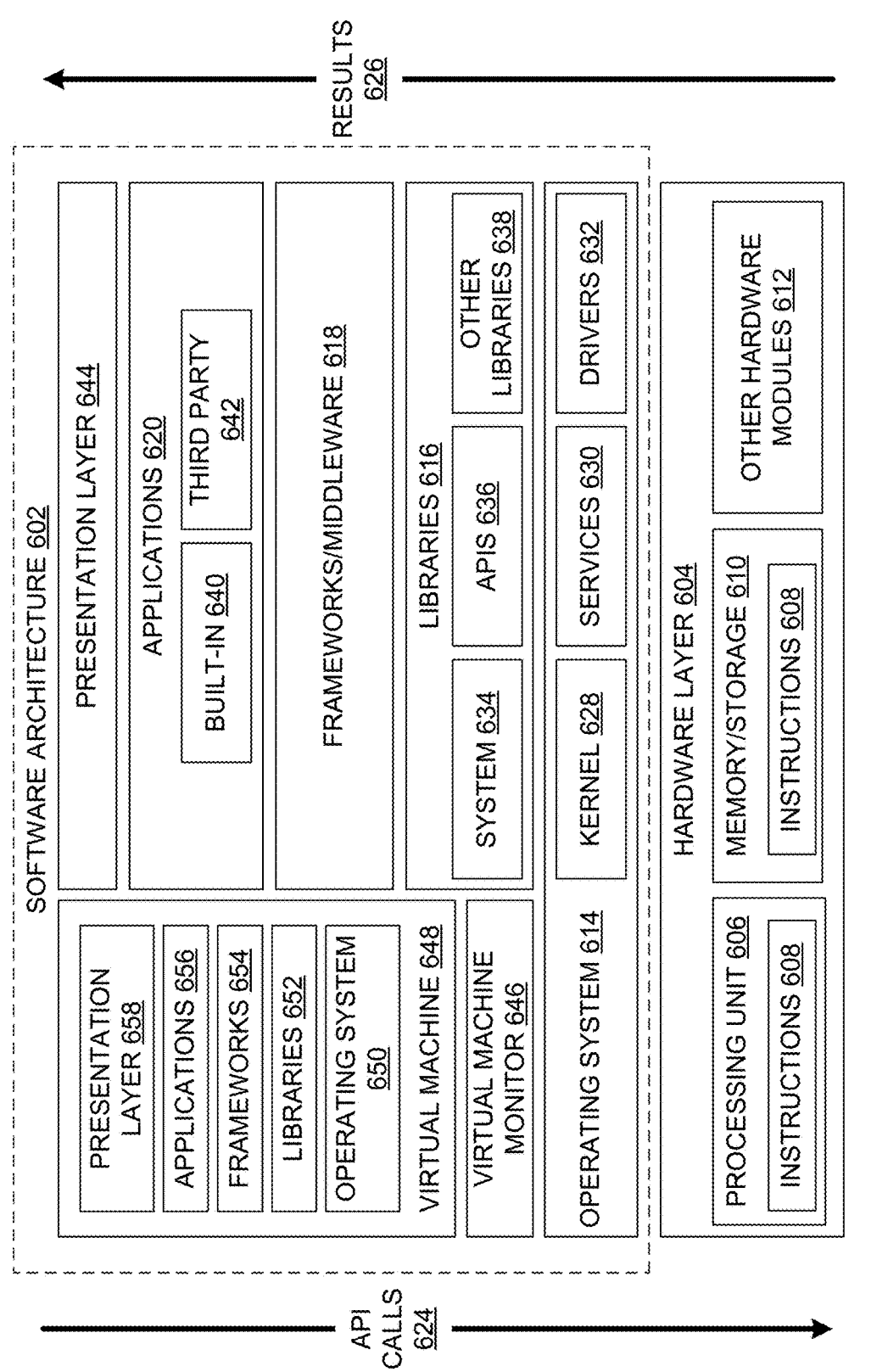
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
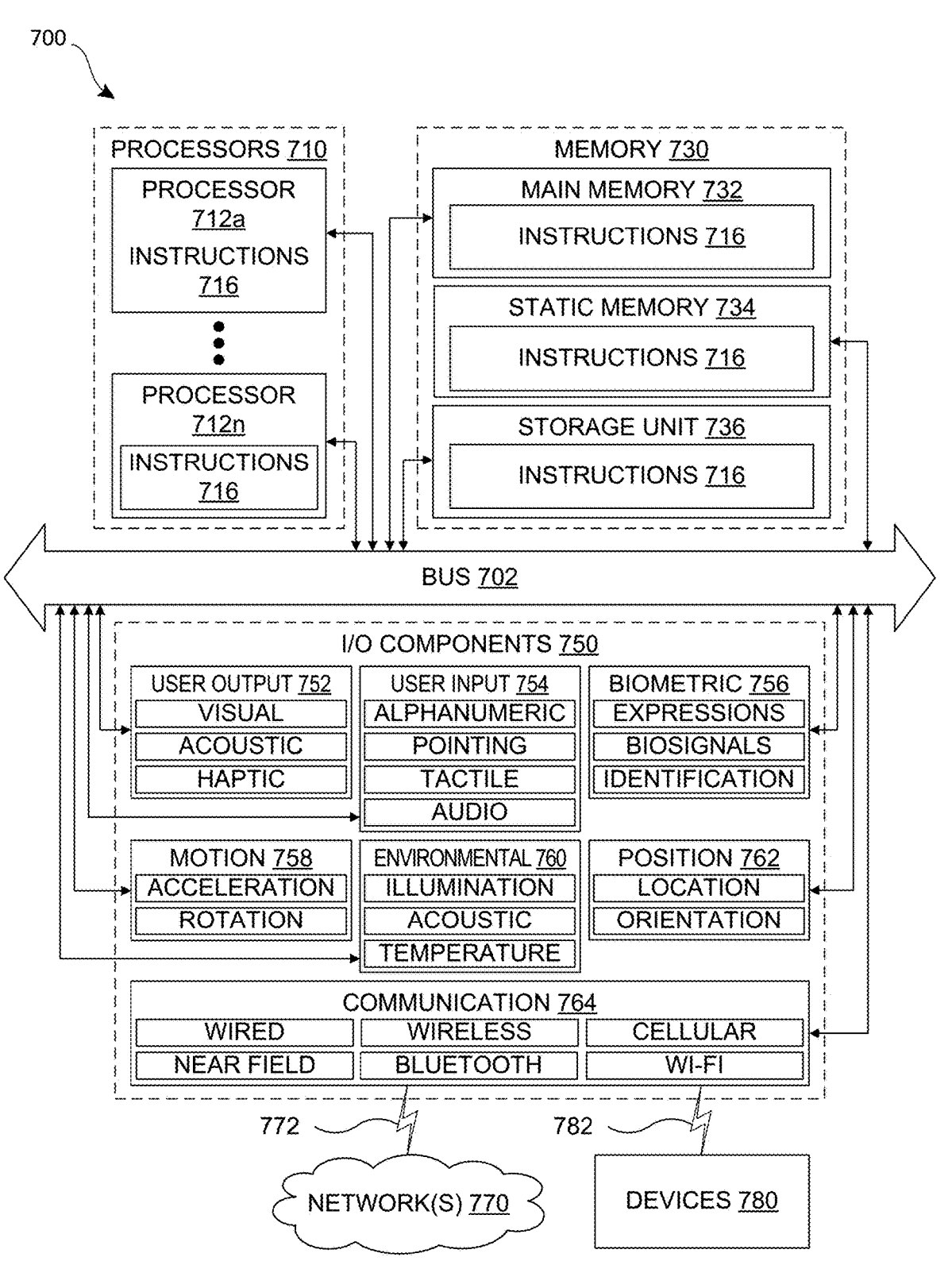
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 764, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising: a processor; and a machine-readable storage medium storing executable instructions that, when executed, cause the processor alone or in combination with other processors to perform operations of: receiving a first input in a spreadsheet in a spreadsheet application;

detecting an indication that the first input includes first executable program code, the first executable program code being associated with a first cell of the spreadsheet application and storing the first executable program code within the spreadsheet by storing the first executable program code in metadata associated with the first cell;

presenting the first executable program code in a code editor panel of a user interface of the spreadsheet application;

detecting a selection of one or more first elements of the spreadsheet in the user interface of the spreadsheet application; highlighting the one or more first elements of the spreadsheet in the user interface of the spreadsheet application responsive to detecting the selection of the one or more first elements;

automatically updating the first executable program code to include one or more references to the one or more first elements of the spreadsheet responsive to detecting the selection of the one or more first elements to generate updated first executable program code; presenting the updated first executable program code in the code editor panel of the user interface of the spreadsheet application;

highlighting the one or more references to the one or more first elements in the code editor panel of the user interface of the spreadsheet application;

analyzing the first executable program code to identify first references to one or more first elements of the spreadsheet in the first executable program code;

requesting spreadsheet data associated with the one or more first elements of the spreadsheet from the spreadsheet application;

receiving the spreadsheet data from the spreadsheet application;

executing the first executable program code using the spreadsheet data referenced in the first executable program code to obtain a first program code result;

causing the spreadsheet application to display the first program code result in the spreadsheet application;

monitoring changes to the spreadsheet that affect the one or more first elements of the spreadsheet;

detecting a change to the spreadsheet that updates the first references to the one or more first elements in the spreadsheet;

generating updated references to the one or more first elements based on the change to the spreadsheet; and automatically updating the first executable program code with the updated references in response to detecting the change the spreadsheet.

2. The data processing system of claim 1, wherein the machine-readable storage medium further includes instructions configured to cause the processor alone or in combination with other processors to perform operations of:

causing the spreadsheet application to present the first executable program code in a first editor pane in the spreadsheet application;

detecting a first user input selecting a first reference to the one or more first elements; and causing the spreadsheet application to highlight the one or more first elements in the spreadsheet in response to detecting the first user input.

3. The data processing system of claim 2, wherein the machine-readable storage medium further includes instructions configured to cause the processor alone or in combination with other processors to perform operations of:

detecting a second user input via a first control element of the first editor pane;

configuring the first editor pane and the spreadsheet application to operate in a first editor mode responsive to detecting the second user input, the first editor mode causing the spreadsheet application to monitor user selections of elements within the spreadsheet and to provide references to the user selections to the first editor pane;

detecting a third user input selecting one or more second elements of the spreadsheet;

providing references to the one or more second elements to the first editor pane; and automatically inserting a representation of the references to the one or more second elements into the first executable program code.

4. The data processing system of claim 3, wherein the machine-readable storage medium further includes instructions configured to cause the processor alone or in combination with other processors to perform operations of:

receiving a second input associated with a second cell in the spreadsheet in the spreadsheet application;

detecting the indication that the second input includes second executable program code;

analyzing the second executable program code to identify second references to one or more second elements of the spreadsheet in the second executable program code;

requesting spreadsheet data associated with the one or more second elements of the spreadsheet from the spreadsheet application;

receiving the spreadsheet data from the spreadsheet application;

executing the second executable program code using the spreadsheet data referenced in the second executable program code to obtain a second program code result;

causing the spreadsheet application to store the second program code result in the spreadsheet application; and causing the spreadsheet application to present the first executable program code in a second editor pane in the spreadsheet application.

5. The data processing system of claim 4, wherein the machine-readable storage medium further includes instructions configured to cause the processor alone or in combination with other processors to perform operations of:

causing the spreadsheet application to display a code editor panel, wherein the code editor panel presents the first editor pane associated with the first executable program code and the second editor pane associated with the second executable program code in an order of execution of the first executable program code and the second executable program code.

6. The data processing system of claim 5, wherein the machine-readable storage medium further includes instructions configured to cause the processor alone or in combination with other processors to perform operations of:

detecting a third user input via a second control element of the code editor panel;

causing the code editor panel to display a third editor pane for third executable program code;

receiving an indication of a third cell of the spreadsheet to associate with the third executable program code;

receiving third program code via the third editor pane; and associating the third program code with the third cell of the spreadsheet.

7. A method implemented in a data processing system for integrating executable program code with a spreadsheet application, the method comprising:

receiving a first input in a spreadsheet in a spreadsheet application;

detecting an indication that the first input includes first executable program code, the first executable program code being associated with a first cell of the spreadsheet application and storing the first executable program code within the spreadsheet by storing the first executable program code in metadata associated with the first cell;

presenting the first executable program code in a code editor panel of a user interface of the spreadsheet application;

detecting a selection of one or more first elements of the spreadsheet in the user interface of the spreadsheet application;

highlighting the one or more first elements of the spreadsheet in the user interface of the spreadsheet application responsive to detecting the selection of the one or more first elements;

automatically updating the first executable program code to include one or more references to the one or more first elements of the spreadsheet responsive to detecting the selection of the one or more first elements to generate updated first executable program code;

presenting the updated first executable program code in the code editor panel of the user interface of the spreadsheet application;

highlighting the one or more references to the one or more first elements in the code editor panel of the user interface of the spreadsheet application;

analyzing the first executable program code to identify first references to one or more first elements of the spreadsheet in the first executable program code;

requesting spreadsheet data associated with the one or more first elements of the spreadsheet from the spreadsheet application;

receiving the spreadsheet data from the spreadsheet application;

executing the first executable program code using the spreadsheet data referenced in the first executable program code to obtain a first program code result;

causing the spreadsheet application to display the first program code result in the spreadsheet application;

monitoring changes to the spreadsheet that affect the one or more first elements of the spreadsheet;

detecting a change to the spreadsheet that updates the first references to the one or more first elements in the spreadsheet;

generating updated references to the one or more first elements based on the change to the spreadsheet; and automatically updating the first executable program code with the updated references in response to detecting the change the spreadsheet.

8. The method of claim 7, further comprising:

causing the spreadsheet application to present the first executable program code in a first editor pane in the spreadsheet application;

detecting a first user input selecting a first reference to the one or more first elements; and causing the spreadsheet application to highlight the one or more first elements in the spreadsheet in response to detecting the first user input.

9. The method of claim 8, further comprising:

detecting a second user input via a first control element of the first editor pane;

configuring the first editor pane and the spreadsheet application to operate in a first editor mode responsive to detecting the second user input, the first editor mode causing the spreadsheet application to monitor user selections of elements within the spreadsheet and to provide references to the user selections to the first editor pane;

detecting a third user input selecting one or more second elements of the spreadsheet;

providing references to the one or more second elements to the first editor pane; and automatically inserting a representation of the references to the one or more second elements into the first executable program code.

10. The method of claim 9, further comprising:

receiving a second input associated with a second cell in the spreadsheet in the spreadsheet application;

detecting the indication that the second input includes second executable program code;

analyzing the second executable program code to identify second references to one or more second elements of the spreadsheet in the second executable program code;

requesting spreadsheet data associated with the one or more second elements of the spreadsheet from the spreadsheet application;

receiving the spreadsheet data from the spreadsheet application;

executing the second executable program code using the spreadsheet data referenced in the second executable program code to obtain a second program code result;

causing the spreadsheet application to store the second program code result in the spreadsheet application; and causing the spreadsheet application to present the first executable program code in a second editor pane in the spreadsheet application.

* * * * *